(12) United States Patent
Baldwin

(10) Patent No.: US 9,740,278 B2
(45) Date of Patent: *Aug. 22, 2017

(54) METHOD, DEVICE AND STORAGE MEDIUM FOR CONTROLLING PRESENTATION OF MEDIA CONTENT BASED ON ATTENTIVENESS

(71) Applicant: AT&T INTELLECTUAL PROPERTY I, LP, Atlanta, GA (US)

(72) Inventor: Christopher Baldwin, Algonquin, IL (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 6 days.

This patent is subject to a terminal disclaimer.

(21) Appl. No.: 14/844,725

(22) Filed: Sep. 3, 2015

(65) Prior Publication Data

US 2015/0378430 A1    Dec. 31, 2015

Related U.S. Application Data

(63) Continuation of application No. 13/648,858, filed on Oct. 10, 2012, now Pat. No. 9,152,227.

(51) Int. Cl.
*G06T 1/00*        (2006.01)
*G06F 3/01*        (2006.01)
*G06K 9/00*        (2006.01)

(52) U.S. Cl.
CPC .............. *G06F 3/011* (2013.01); *G06F 3/013* (2013.01); *G06F 3/017* (2013.01); *G06K 9/00342* (2013.01); *G06F 2203/011* (2013.01)

(58) Field of Classification Search
None
See application file for complete search history.

(56) References Cited

U.S. PATENT DOCUMENTS

| | | | |
|---|---|---|---|
| 4,843,568 | A | 6/1989 | Krueger et al. |
| 4,931,865 | A | 6/1990 | Scarampi |
| 7,512,889 | B2 | 3/2009 | Newell et al. |
| 8,032,477 | B1 | 10/2011 | Hoffberg et al. |
| 8,760,395 | B2 | 6/2014 | Kim et al. |

(Continued)

FOREIGN PATENT DOCUMENTS

GB        2459707 A  * 11/2009  ............. H04N 5/781

*Primary Examiner* — Barry Drennan
*Assistant Examiner* — Jason Pringle-Parker
(74) *Attorney, Agent, or Firm* — Guntin & Gust, PLC; Joseph Hrutka

(57) ABSTRACT

A method that incorporates teachings of the subject disclosure may include, for example, determining a viewing orientation of a first viewer in a viewing area from a plurality of images captured from the viewing area during a presentation of media content, determining whether an attentiveness level of the first viewer during the presentation of the media content is below a threshold by correlating the viewing orientation with the presentation of the media content, and performing an operation associated with the presentation of the media content at a display, where the operation is selected from a first viewer profile associated with the first viewer according to the viewing orientation responsive to determining that the attentiveness level is below the threshold. Other embodiments are disclosed.

20 Claims, 7 Drawing Sheets

(56) References Cited

U.S. PATENT DOCUMENTS

| | | | |
|---|---|---|---|
| 8,782,566 B2* | 7/2014 | Sarkar | G06F 3/04883 |
| | | | 715/728 |
| 2002/0144259 A1* | 10/2002 | Gutta | G06F 3/011 |
| | | | 725/10 |
| 2003/0058341 A1* | 3/2003 | Brodsky | G06K 9/00335 |
| | | | 348/169 |
| 2004/0193413 A1 | 9/2004 | Wilson et al. | |
| 2004/0194129 A1 | 9/2004 | Carlbom et al. | |
| 2006/0028429 A1* | 2/2006 | Kanevsky | G06F 3/017 |
| | | | 345/156 |
| 2006/0256133 A1* | 11/2006 | Rosenberg | G06Q 30/02 |
| | | | 345/619 |
| 2009/0208052 A1* | 8/2009 | Kaplan | G06F 3/011 |
| | | | 382/103 |
| 2010/0080464 A1* | 4/2010 | Sawai | G06F 3/012 |
| | | | 382/190 |
| 2010/0107184 A1 | 4/2010 | Shintani | |
| 2010/0146530 A1 | 6/2010 | Bolyukh et al. | |
| 2010/0162285 A1* | 6/2010 | Cohen | H04H 60/31 |
| | | | 725/12 |
| 2010/0162286 A1 | 6/2010 | Berry | |
| 2011/0173574 A1 | 7/2011 | Clavin et al. | |
| 2011/0175932 A1 | 7/2011 | Yu et al. | |
| 2011/0246329 A1 | 10/2011 | Geisner et al. | |
| 2011/0274405 A1 | 11/2011 | Godar | |
| 2012/0258691 A1* | 10/2012 | Baer | G06F 3/0481 |
| | | | 455/412.2 |
| 2013/0013087 A1* | 1/2013 | Aliakseyeu | G06F 3/011 |
| | | | 700/83 |
| 2013/0154913 A1* | 6/2013 | Genc | G06F 3/012 |
| | | | 345/156 |

* cited by examiner

200

300

400

METHOD, DEVICE AND STORAGE MEDIUM FOR CONTROLLING PRESENTATION OF MEDIA CONTENT BASED ON ATTENTIVENESS

CROSS-REFERENCE TO RELATED APPLICATIONS

This application is a Continuation of U.S. patent application Ser. No. 13/648,858, filed Oct. 10, 2012, by Baldwin, entitled "Method and Apparatus for Controlling Presentation of Media Content", now U.S. Pat. No. 9,152,227. All sections of the aforementioned application are incorporated herein by reference in its entirety.

FIELD OF THE DISCLOSURE

The subject disclosure relates to a method and apparatus for controlling presentation of media content.

BACKGROUND

Media content is typically experienced by consumers via devices such as computers, televisions, radios, and mobile electronics. Media content is frequently delivered by service providers, who send the content, such as television, radio, and video programming, to consumers for enjoyment at their physical locations. Modern communication networks benefit from interconnectivity between consumers and various communication devices. Consumers typically experience media content via a display or presentation device. As network capabilities expand, these interconnections provide new opportunities to enhance the ability for consumers to enjoy media content by experiencing a variety of content over multiple devices. Intelligent devices offer new means for the enjoyment of content in ways that anticipate consumer desires.

BRIEF DESCRIPTION OF THE DRAWINGS

Reference will now be made to the accompanying drawings, which are not necessarily drawn to scale, and wherein.

DETAILED DESCRIPTION

Figure 1:
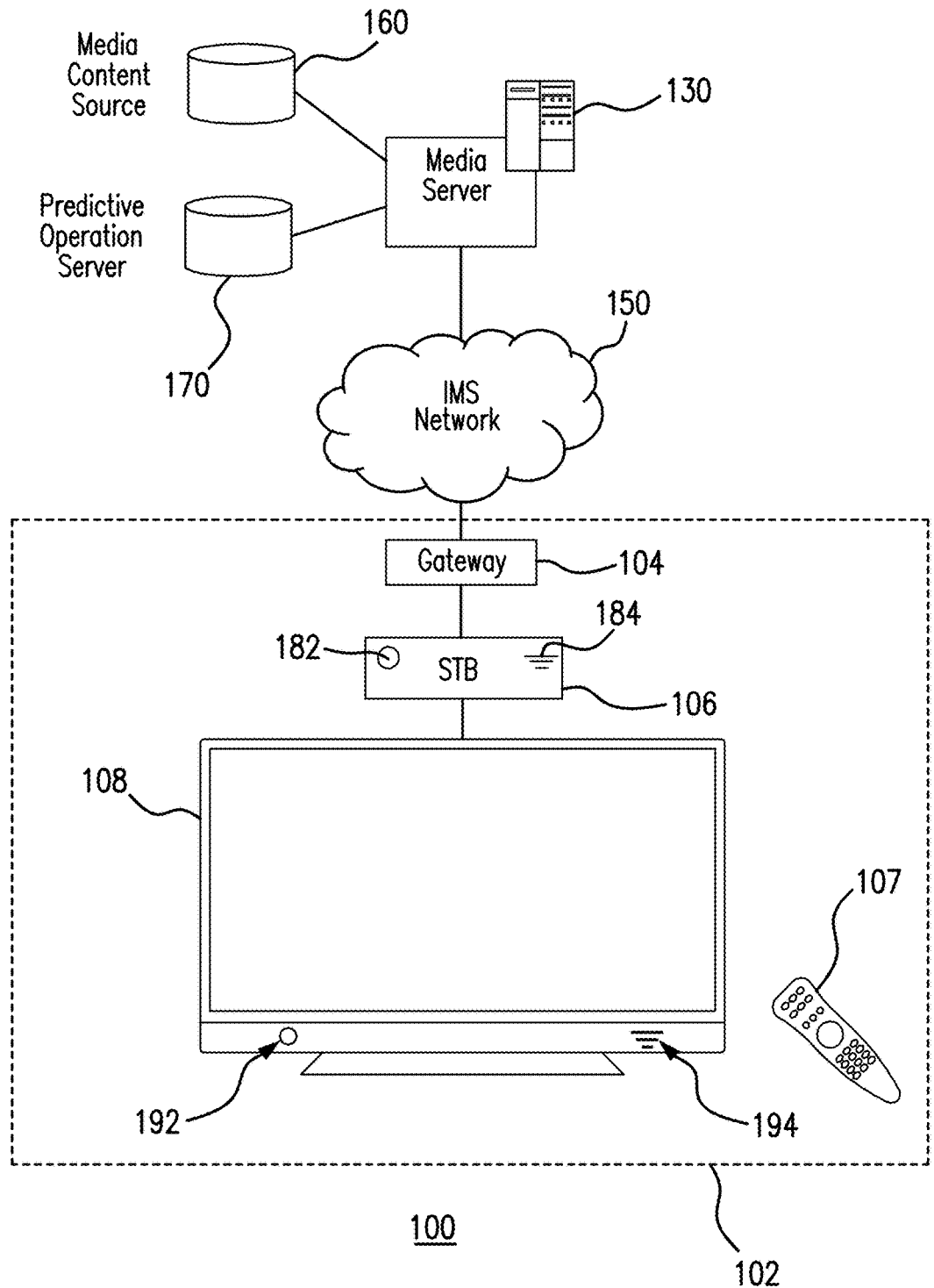
FIG. 1 depicts an illustrative embodiment of a system that can be utilized for controlling the presentation of media content.

The subject disclosure describes, among other things, illustrative embodiments for determining a viewing orientation of a viewer at a viewing area, determining whether an attentiveness level of the viewer is below a threshold and, if so, performing an operation that is selected from a viewer profile based on the viewer orientation. Other embodiments are included in the subject disclosure.

One embodiment of the subject disclosure includes a memory storing computer instructions and a processor coupled to the memory. The processor can perform operations responsive to executing the computer instructions including presenting media content at a display that is visible to a viewing area. The processor can also perform operations for capturing a plurality of images from the viewing area during the presenting of the media content and detecting a presence of a first viewer in the viewing area from the plurality of images. The processor can further perform operations for determining a viewing orientation of the first viewer from the plurality of images responsive to detecting the presence of the first viewer. The processor can perform operations for determining an attentiveness level of the first viewer by correlating the viewing orientation with the media content and, in turn, determining if the attentiveness level is below a first threshold. The processor can further perform operations for selecting a predicted action from a plurality of predicted actions for the first viewer from a first viewer profile associated with the first viewer according to the viewing orientation responsive to determining that the attentiveness level is below the first threshold. The processor can perform operations for performing an operation associated with the presenting of the media content at the display according to the predicted action of the first viewer.

One embodiment of the subject disclosure includes a tangible computer-readable storage medium including computer instructions, which, responsive to being executed by at least one processor, can cause the at least one processor to perform operations including determining a viewing orientation of a first viewer in a viewing area from a plurality of images captured from the viewing area during a presentation of media content. The computer instructions can further include determining whether an attentiveness level of the first viewer during the presentation of the media content is below a threshold by correlating the viewing orientation with the presentation of the media content. The computer instructions can, in turn, predicting a first action for the first viewer from a first viewer profile associated with the first viewer according to the viewing orientation responsive to determining that the attentiveness level is below the threshold. The computer instructions can include performing an operation associated with the presentation of the media content at a display according to the first action of the first viewer.

One embodiment of the subject disclosure includes a method including determining, by a system comprising a processor, a viewing orientation of a first viewer in a viewing area from a plurality of images captured from the viewing area during a presentation of media content. The method further includes determining, by the system, whether an attentiveness level of the first viewer during the presentation of the media content is below a threshold by correlating the viewing orientation with the presentation of the media content. The method also includes performing, by the system, an operation associated with the presentation of the media content at a display. The operation can be selected from a first viewer profile associated with the first viewer according to the viewing orientation responsive to determining that the attentiveness level is below the threshold.

FIG. 1 depicts an illustrative embodiment of a system 100 that can be utilized for controlling the presentation of media content. The system 100 can comprise equipment for providing media content and presenting media content at a viewing location 102. The system 100 can be further utilized for determining a viewing orientation of a viewer at a viewing area, determining if an attentiveness level of the viewer is below a threshold and, if so, performing an operation that is selected from a viewer profile based on the viewer orientation.

In one embodiment, a media server 130 can receive media content from a media content source 160 and provide this media content to a viewing location. The media server 130 and the media content source 160 can perform a portion of a subscription content service, such as cable, satellite, or DSL based media content delivery system. The media content can be any type of viewable content, such as broadcast television, cable or premium television, video on demand, or pay-per-per view television. The media server 130 can deliver the media content to the viewing location 102 by means of a communication network 150. In one embodiment, the media server 130 delivers media content by utilizing an internet protocol compatible, multimedia subsystem (IMS) network architecture 150. In other embodiments, the media server 130 can deliver media content to the viewing location 102 by a private communication network or a public communication network, such as the World Wide Web. In other embodiments, the media server 130 can deliver media content over any type of transport media, such as a satellite link, a cable line, and/or a fiber optic network.

The media content can be received at the viewing location 102 by a gateway device 104. In one embodiment, the gateway device 104 can function as an interface between an external network 150 and one or more media processor devices 106 at the viewing location 102. In one embodiment, the gateway device 104 can provide internetworking functions, such as protocol translation, impedance matching, data rate conversion, and/or fault isolation necessary for exchanging data between the external network 150 and the viewing location 102.

One or more media processor devices 106 can be utilized at the viewing location 102 to present the media content at a display device 108. The media processor device 106 can be, for example, a set-top box, a computer device, or a mobile device. The media processor device 106 can receive media content as an encoded data packet stream and can decode this data into a data stream that is presentable at the display device. In other embodiments, the media processor device 106 can further perform functions of providing an electronic programming guide for selection of programming from the media server 130, authentication of the media processor device 106 for reception of media content, storage and updating of user preferences, and parental control of media content. The media processor device 106 can be controlled utilizing a remote controller device 107. The media processor device 106 can cause the received media content to be presented at a display device 108 that is visible to the viewing area 102.

In one embodiment, the media processor device 106 can include a processor video camera 182 that can capture images in the viewing area 102 or a portion thereof. In another embodiment, the media display device 108 can include a display video camera 192 that can capture images in the viewing area 102 or a portion thereof. The media display device 108 can transmit video image data that is captured at the media display device 108 or the media processor device 106. In one embodiment, the media processor device 106 can analyze the captured video image data from the processor video camera 182 and/or the display video camera 192 to determine a viewing orientation of a viewer at a viewing area 102. In another embodiment, the media processor device 106 can further analyze the video image data to determine whether an attentiveness level of the viewer is below a threshold. If the attentiveness level of the viewer is found to be below the threshold, then the media processor device 106 can respond by selecting an operation from a viewer profile based on the viewing orientation. The media processor device 106 can, in turn, perform the selected operation or can cause the media display device 108 to perform the selected operation.

In another embodiment, the media processor device 106 can include a processor microphone or audio input 184 that can capture audio from the viewing area 102. In another embodiment, the media display device 108 can include a display microphone or audio input 194 that can capture audio in the viewing area 102. The media display device 108 can transmit audio data that is captured at the media display device 108 to media processor device 106. In one embodiment, the media processor device 106 can analyze the captured audio data from the processor microphone 184 and/or the display microphone 194 to determine a viewing orientation of a viewer at a viewing area 102. In another embodiment, the media processor device 106 can further analyze the audio data to determine speech content from the audio data of the viewer. In one embodiment, the determined speech content can be further analyzed to identify or otherwise detect a correlation to the media content being presented, such as to determine whether the speech has resulted from a user that is being attentive to the media content. The media processor level can select an operation from the viewer profile based on the viewing orientation. The media processor device 106 can, in turn, perform the selected operation or can cause the media display device 108 to perform the selected operation. In one embodiment, a predictive operation server 170, remote from the media processor device 106, can be used to analyze captured video and audio to determine viewer identities, location, orientations, attentiveness, and/or attentive directions. In one embodiment, the viewer profiles can be stored and/or accessed at the predictive operation server 170.

Figure 2:
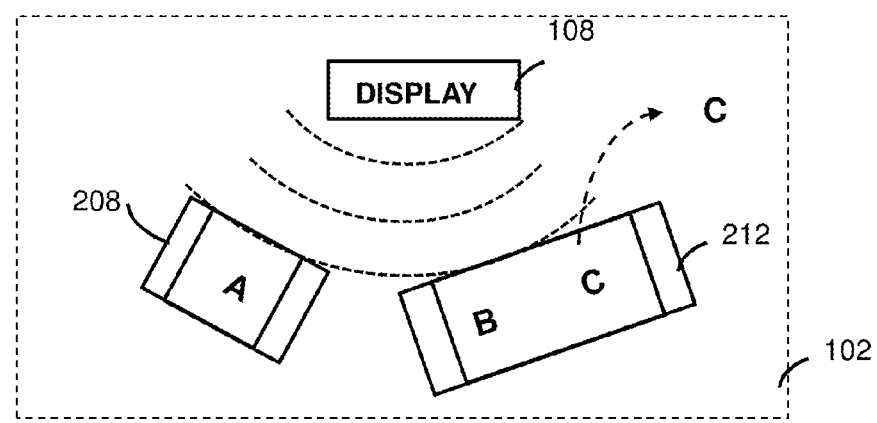
FIGS. 2-4 depict illustrative embodiments of viewing orientations that can be detected and utilized for media content presentation in the system of FIG. 1.
Figure 3:
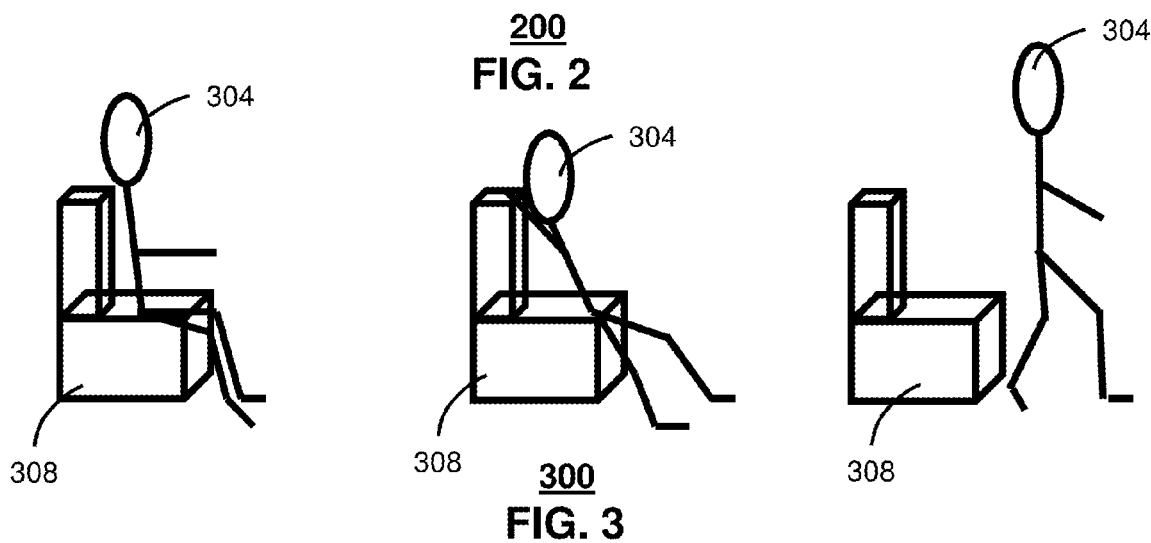
Figure 4:
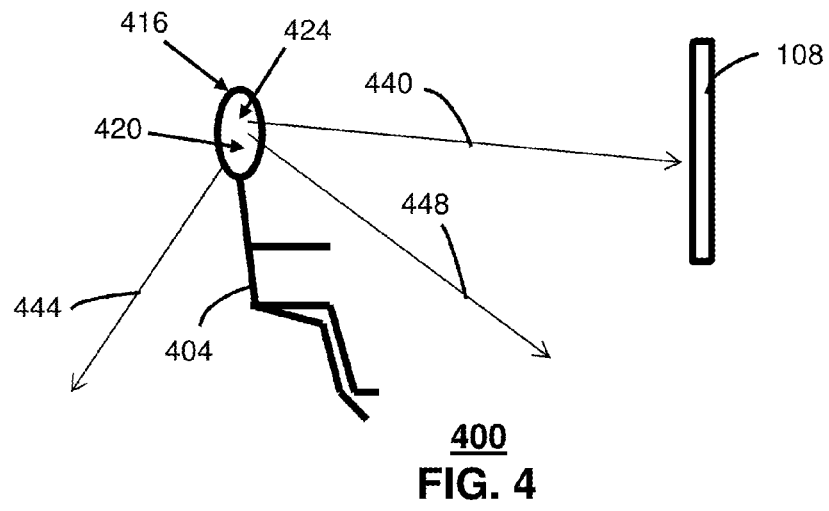

FIGS. 2-4 depict illustrative embodiments 200-400 of viewing orientations that can be detected and utilized by the system 100 to control the presentation of media content. Referring to FIG. 2, a viewing area 102 for the system 100 is illustrated in several embodiments 200. The media display 204 is visible to viewers A, B, and C who are present in the viewing area 102. The video camera and/or audio capture capability of the media processor device 106 and/or display device 108 allows the system 100 to capture video image data and/or audio data from the viewing area 102. In one embodiment, the system 100 can detect the presence of one or more viewers A, B, and C in the viewing area 102. For example, the media processor device 106 can detect that three viewers A, B, and C are in the viewing area 102. The media processor device 106 can compare video images of the viewing area 102, absent any viewers, with video images taken while the media content is being presented at the media display device 108. If viewers are present, the media processor device 106 can detect the presence by, for example, a pattern recognition algorithm.

In another embodiment, the system 100 can determine one or more identities of the viewers by pattern recognition. For example, the system 100 can detect the presence of particular viewers A and B by comparing the captured video image data to viewer profiles of viewers A and B. For example, the system can analyze image data to identify a number of viewers present and/or identities of each person present. The viewer profile can include identifying images of one or more viewers. The media processor device 106 can compare the captured video images to the these identifying images using an image identification routine. In addition, the system 100 can detect that a particular person, viewer C, is not present or can detect that viewer C has moved within the viewing area 102 or has left the viewing area 102.

In another embodiment, the system 100 can determine one or more viewer orientations in the viewing area 102. In one embodiment, the viewer orientation can be a location of a viewer A within the viewing area 102. In another embodiment, the viewer orientation can be the physical location of one or more viewers A, B, and C in furnishings 208 and 212 of the viewing area. For example, the system 100 can determine that viewer A is sitting in a chair 208 while viewers B and C are sitting in a sofa 212. In another embodiment, the viewer orientation can be determined based on a movement of a viewer within the viewing area 102. For example, the system 100 can determine that viewer C has moved from a first location at the sofa 212 to a second location in front of the sofa or outside of the viewing area 102. In one embodiment, the system 100 can detect the presence of one or more viewers A, B, and C in the viewing area 102 using the captured audio from the viewing area 102. For example, the system 100 can compare the captured audio data to viewer profile data for any subscribers or viewers that use the media processor device 106. The viewer profile can include identifying audio from one or more viewers. The media processor device 106 can compare the captured audio to the identifying audio.

Referring to FIG. 3, body posture recognition is illustrated in several embodiments 300. The system 100 can use the video images from the viewing area 102 to determine a viewer orientation that includes information on a posture of a viewer 304 in the viewing area 102. The system 100 can determine the viewer's posture while standing or sitting and can determine the position and posture of the viewer with respect to a furnishing, such as a chair 308. For example, a viewer 304 can be, alternatively, seated upright in a chair 308, slumping or lounging in the chair 308, or rising from the chair 308.

Referring to FIG. 4, attentive direction is illustrated in several embodiments 400. The system 100 can use the video images from the viewing area 102 to determine a viewer orientation that includes information on an attentive direction of a viewer 404 in the viewing area 102. For example, the system 100 can determine that a viewer 404 is looking at the images coming from the display 108, is not looking at the images on the display 108, or is only somewhat looking at the display 108. For example, a viewer 404 can be, alternatively, casting his attentive direction (looking) toward 440 the display 108, completely away 444 from the display 108, or somewhat toward the display 448. In one embodiment, the system 100 can analyze the video images captured from the viewing area 102 to determine an orientation of the viewer's head 416, a direction where the viewer's face 420 is pointing, and/or a direction where the viewer's eyes are gazing.

Figure 5:
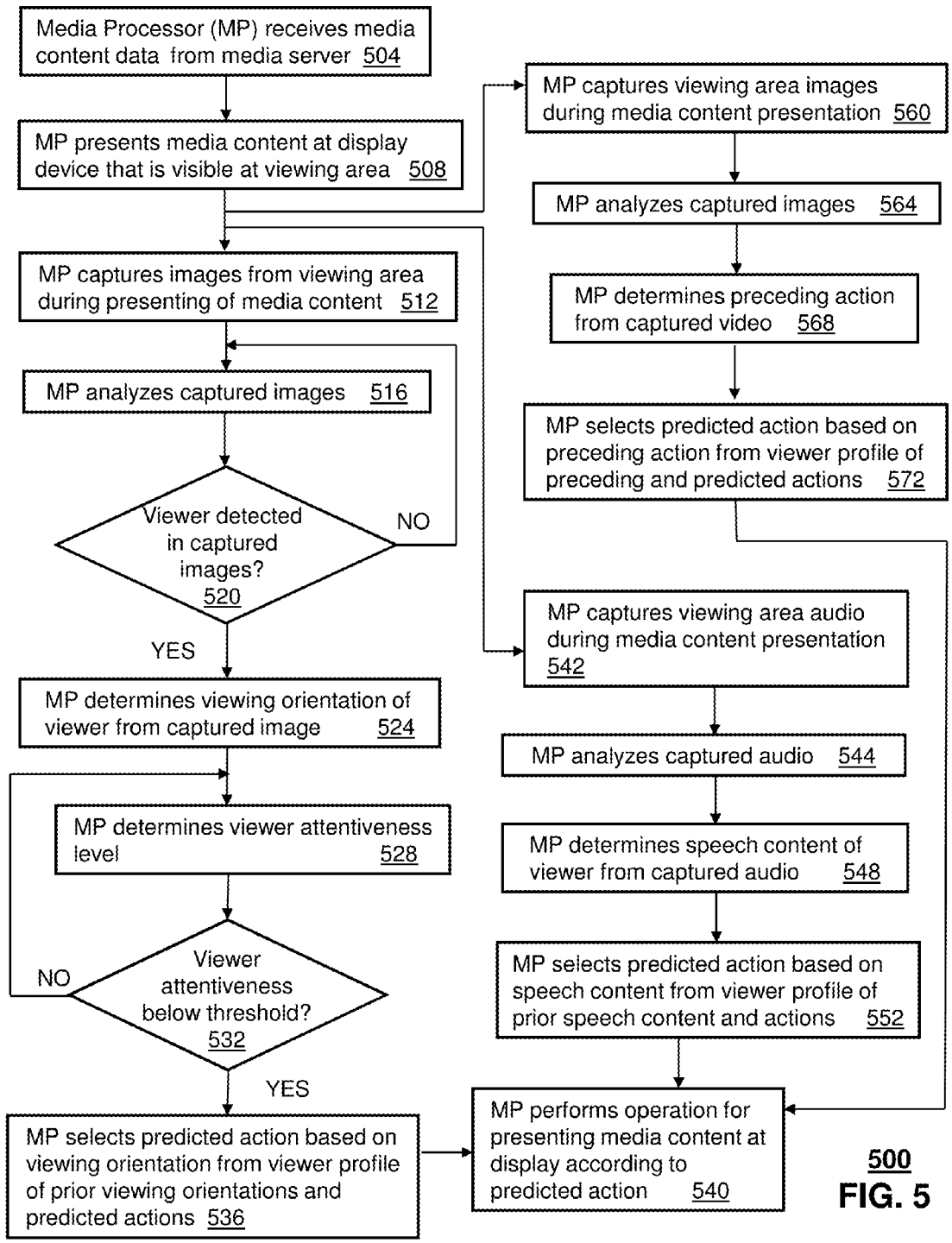
FIG. 5 depicts an illustrative embodiment of a method operating in portions of the system described in FIGS. 1-7.

FIG. 5 depicts an illustrative embodiment of a method operating in portions of the systems and devices described in FIG. 1. Method 500 can begin with step 504, which illustrates that the media processor device 106 can receive media content data from a network. In one embodiment, a media server 130 can transmit media content data to the media processor device 106. In step 508, the media processor device 106 can present the media content at a media display device 108. In step 512, the media processor device 106 can capture video images from the viewing area 102 during the presentation of the media content. In step 516, the media processor device can analyze the captured video images and, in step 520, can detect if one or more viewers are present in the captured images. In step 524, if a viewer is detected in the captured images, then the media processor device 106 can determine one or more viewer orientations from the capture image.

In step 528, the viewer orientation can simply be a determination of a viewer attentiveness level based on the analyzed images. In one embodiment, the viewer orientation can simply be a location of the viewer within the viewing area 102. In one embodiment, the viewer orientation can be a location of the viewer with respect to a furnishing 212 in the viewing area 102. In one embodiment, the viewer orientation can be a movement of the viewer within the viewing area 102 or a movement to enter or depart the view area 102. In one embodiment, the viewer orientation can include information describing a posture of the viewer. For example, if the viewer is sitting in a chair, then the posture of the viewer can describe sitting with straight or alert posture and/or sitting with slouching or lax posture. In another example, the viewing posture can describe how the viewer is standing or how the viewer is lying down.

In one embodiment, the viewer orientation can be an attentive direction. For example, system 100 can use video images from the viewing area to determine a position of the viewer's head, face, and/or eyes. The system 100 can analyze the viewer's head, face, and/or eyes to determine which way the viewer is looking. The system 100 can use the determination of where the viewer is looking to further determine the viewer's attentiveness upon the displayed media content.

In step 532, the media processor device 106 can determine if the viewer attentiveness is below a threshold level. For example, if an attentiveness level is determined to be a "4" out of a possible "10" and the threshold is "6," then the viewer's attentiveness is determined to be below the required threshold. In one embodiment, each viewer orientation type can be mapped to a common viewer attentiveness level. For example, a viewer orientation can be determined where the viewer is found to be sitting on a sofa in the viewing area 102 and the same viewer is found to the slouching in the sofa. From a viewer orientation perspective, the viewer has three orientations, one for the location in the viewing area 102, one for sitting in the sofa, and one for slouching while sitting. In one embodiment, the media processor device 106 can analyze each viewer orientation component, separately, to determine three different viewer attentiveness levels—one for each orientation. The media processor device 106 can then combine the three attentiveness levels to create a single attentiveness level that describes an overall attention level of the viewer directed to the displayed media content. For example, the media processor device 106 can combine the several attentiveness levels via a statistical technique, such as an average or weighted average. The media processor device 106 can then compare the single attentiveness level to a threshold. In another embodiment, the media processor device 106 can maintain separate attentiveness levels for each viewer orientation and compare each of these, individually, to its own threshold.

In one embodiment, the viewer attentiveness level represents a measure of the degree to which the viewer is paying attention to the media content. In one embodiment, the media processor device 106 can determine the attentiveness level by analyzing the viewer orientation—location, posture, etc.,—against the media content that is being displayed at the viewing area 102 at that time. For example, the media processor device 106 can assign different attentiveness levels for the same or similar viewer orientations (such as the same posture) if the media content is significantly different. Where, for example, a posture of lying down might indicate one level of attentiveness where the presented media content is a movie and another level of attentiveness where the media content is a sporting event.

In one embodiment, the media processor device 106 can apply different weights to attentiveness levels that are determined based on different viewer orientations. For example, if the media processor device 106 determines a viewer orientation based on attentive direction, thereby indicating where the viewer is actually looking or, in the case of eye direction, where the viewer's eyes are directed, then it reasonable for the media processor device 106 to apply a higher weight to this observed viewer orientation than it would to a determination of the viewer's location in the viewing area. When determining how closely a viewer is paying attention to media content, it is of more value to know where the viewer is looking than to know where they are sitting.

In step 536, if the viewer attentiveness is below the threshold, then the media processor device 106 can select a predicted action for the viewer from a viewer profile based on the viewing orientation. In one embodiment, a sub-threshold level of viewer attentiveness can indicate that the viewer is paying so little attention to the presented media content that it is reasonable to conclude that the viewer has lost interest and might prefer that the media processor device 106 take an action to change some facet of the presentation. In one embodiment, a viewer profile can be generated and maintained for the media processor device 106 or for each identified viewer of the media processor device 106. In one embodiment, the media processor device 106 can access the viewer profile and compare a listing of viewing orientations to the determined viewing orientation. For example, if the media processor device 106 has determined based on the video capture that the viewer has crossed over from one side of the viewing area to the other, then the media processor 106 can determine from the viewer profile a predicted action based on the viewer crossing the viewing area. If this incident of viewer orientation is available in the viewer profile, then the media processor device 106 attempts to receive from the profile a predicted action, corresponding to the crossing the room event. For example, if the user profile is configured to indicate that the viewer wishes for the media processor device 106 to increase the volume any time the crossing the room event is encountered, then the media processor device will receive the predicted action. In one embodiment, the viewer profile is configured with a set of viewer orientations coupled to a set of predicted actions. For example, a viewer orientation of falling asleep in a chair could be configured to elicit a predicted action of turning OFF the media display device 108. A viewer orientation of snoring—detected by the audio capture mechanism—could elicit the same predicted action. A viewer orientation of leaving the viewing area might correspond to a predicted action of changing the channel to a news station. However, if the viewer was paying good attention to the media content before leaving the room, then the attentiveness level could remain above the threshold level and the media processor device 106 would not access the viewer profile to select the predicted action. The predicted action would be no action.

In one embodiment, the viewing profile can include prior viewing orientations and prior predicted actions. That is, the viewing profile can be continually and automatically updated to reflect viewer behavior. For example, the media processor device 106 could detect a pattern whereby a viewer repeatedly requests a fast-forwarding operation for a digital video recorder storage device at the media processor device 106 and where these repeated requests consistently correspond to a movement or action of the viewer, such as "speed up" gesture. The media processor device 106 can flag these corresponding events and can update the viewer profile to reflect this correspondence between action and desired result. The media processor device 106 can recognize the "speed up" gesture and respond by fast-forwarding, before the user requests a fast-forward using the remote control. In this way, the media processor device 106 can anticipated and provide fast-forwarding to the viewer. In short, the media processor device 106 can anticipate what the viewer wants to do whenever this viewer orientation is detected. In one embodiment, the media processor device 106 can include several viewer profiles, each associated with a different viewer of media content via the media processor device 106. In one embodiment, the media processor device 106 can access the viewer profile to select a predicted action that is based on inferred viewing context. For example, a user rising and walking to towards the kitchen could indicate intent by the viewer to get something to eat or drink while watching more of the media program when he/she returns. The media processor device 106 can infer this viewing context from the viewing orientation. The viewer profile can include a listing that correlates a set of inferable viewing contexts from the viewing orientations. The media processor device 106 can access this listing to obtain a predicted action, based on inferred viewing context, associated with the present viewing orientation. For example, the media processor device 106 can infer a viewer context of "going to the kitchen for a snack" from the viewer orientation and can retrieve the predicted action of pausing the presentation until the viewer returns to the viewing area. The predicted action can include any action that the viewer could request of the media processor device 106 or of the media display device 108. For example, the viewer's predicted action could include beginning presentation, stopping presentation, pausing presentation, restarting presentation, adjusting volume, adjusting brightness, recording the media content, selecting a different media channel, selecting different media content, turning the display ON, and/or turning the display OFF.

In step 540, the media processor device 106 can perform an operation for presenting the media content at the media display device 108 according to the predicted action. In one embodiment, the operation that is performed by the media processor device 106 can correspond closely, if not exactly match, the predicted action retrieved from the viewer profile. For example, a viewer orientation of rising from a chair can result in a predicted action of causing a pause of the presentation. In turn, the media processor device 106 can perform the operation of causing a pause in the presentation. However, in another embodiment, the media processor device 106 can map the performed operations independently or semi-independently from the predicted action. For example, in the same "rise from the chair" scenario that generated the predicted action of pause, the media processor device 106 can be configured to turn OFF the display device 108 to save power.

In another embodiment, in step 542, the media processor device 106 can capture audio data from the viewing area 102 during the media content presentation. In one embodiment, the audio can be captured at the media processor device 106 or at the media display device 108. In step 544, the media processor device 106 can analyze the captured audio and determine speech content of the viewer from the analyzed audio in step 548. In one embodiment, the media processor device 106 can use a speech recognition algorithm to recognize words spoken by or to the viewer and to record the text as the speech content. In another embodiment, the media processor device 106 can look for special sounds or code words or speech volumes and generate speech "content" based upon these special or code situations. For example, the media processor device 106 can be configured to recognize situations where two different voices are present in the viewing area and to assign to this situation the speech "content" of the viewer having a conversation. This conversation could further indicate a loss of attentiveness and/or a predicted action (such as adjusting the volume of the media display device 108.

In step 552, the media processor device 106 can select a predicted action for the viewer from the viewer profile based on the speech content. The viewer profile can include prior speech content and prior predicted actions. In another embodiment, the viewer profile can correlated speech content to inferable viewing contexts. For example, the media processor device 106 could detect a speech content where the viewer says, "I want to see that again." This media processor device 106 can access the viewer profile and determine an inferred viewing context of the user desiring to present the thirty seconds of the media program again. In step 540, the media processor device 106 can perform an operation for presenting the media content at the media display device 108 according to the predicted action.

In step 560, the media processor device 106 can capture video images from the viewing area 102 during the presentation of the media content. In step 564, the media processor device can analyze the captured video images and, in step 568, can determine if the viewer has performed a preceding action. In one embodiment, the media processor device 106 can determine if the viewer has already performed an action related to the presentation of the media content. For example, if a viewer rises from a chair and leaves the room, then the viewer may desire that this action be adjudged as a command to pause the presentation, regardless of whether or not the viewer has been paying attention to the media content. The media processor device 106 can immediately determine that the viewer has completed a preceding action of leaving the room and can, in turn, access the viewer profile to determine the predicted action (such as pausing the presentation) without waiting for a determination with respect to attentiveness. In step 572, the media processor device 106 can select the predicted action for the viewer from the viewer profile based on the preceding action. The viewer profile can include prior speech content and prior predicted actions. Again, in step 540, the media processor device 106 can perform an operation for presenting the media content at the media display device 108 according to the predicted action. Similarly, the viewer may configure the viewer profile to immediately return the presentation from the pause state as soon as the viewer reenters the viewing area 102.

Upon reviewing the aforementioned embodiments, it would be evident to an artisan with ordinary skill in the art that said embodiments can be modified, reduced, or enhanced without departing from the scope of the claims below. For example, the analysis of the captured video images and/or audio from the viewing area 102 can be performed remotely from the media processor device 106. For example, a predictive operation server 170, remote from the media processor device 106, can be used to analyze capture video and audio, to determine viewer identities, location, orientations, attentiveness, and/or attentive directions. In one embodiment, the viewer profiles can be stored and/or accessed at the predictive operation server 170.

In one embodiment, the viewer profile can be configured to a default setting for all viewers. In one embodiment, the viewer profile can further include a timing factor, such as time of day, day of week, and/or date of month, that can be correlated to the predicted action. For example, the timing factor can be used to cause a determined viewer orientation to result in different predicted actions depending on the day of the week or the time of day. In another embodiment, the viewer profile can incorporate aspects/characteristics of the media content that is being watched. For example, the viewer profile can direct the media processor device 106 to be less sensitive to viewer movements during a sporting event than during a dramatic series or a movie. In one embodiment, the viewer orientation can be a gesture given by the viewer, such as a wave of a hand or a finger. In one embodiment, the media processor device 106 can further determine a comfort level of the viewer, based on the captured video images, and can determine the predicted action from the viewer profile based on the comfort level rather than, or in addition to, the attentiveness level. In one embodiment, the profile can be a group profile for a group of users associated with the media processor device 106.

In one embodiment, the media processor device 106 can use a gaze tracking function to determine where the viewer is looking. In a further embodiment, the media processor device 106 can determine the attentiveness level based, in part, on a location on the display device 108 where the viewer is found to be looking. For example, a viewer might appear to be paying no attention to the media content being presented but could desire that the media content continue as long as the viewer looks at a particular portion of the display 108 (like a scoreboard, ticker, or logo) at a sufficiently frequent rate.

Figure 6:
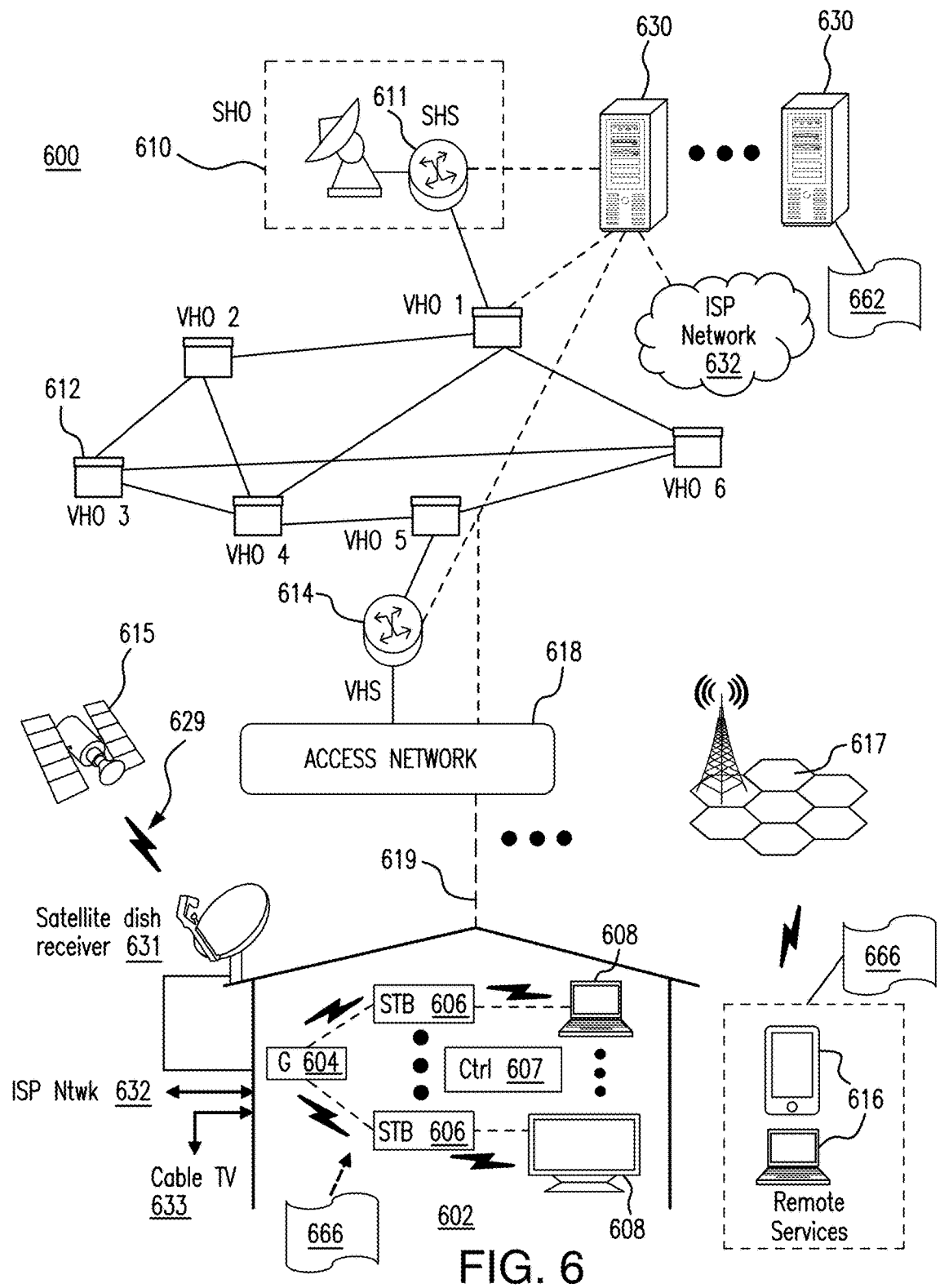
FIGS. 6-7 depict illustrative embodiments of communication systems that provide media services.

FIG. 6 depicts an illustrative embodiment of a first communication system 600 for delivering media content. The communication system 600 can represent an Internet Protocol Television (IPTV) media system. The communication system 600 can be utilized to provide media content to a media processor device 606 for presentation by a media display device 608. The system 600 can determine a viewing orientation of a first viewer in a viewing area of the media display device 608 from a plurality of images captured from the viewing area during a presentation of media content. The system 600 can further determine whether an attentiveness level of the first viewer during the presentation of the media content is below a threshold. The determination can be performed by, for example, correlating the viewing orientation with the presentation of the media content. A predicted action for the viewer can be accessed from a viewer profile associated with the viewer according to the viewing orientation and responsive to determining that the attentiveness level is below the threshold. For example, the viewer profile can correlate a plurality of prior actions with a plurality of prior viewing orientations. The media processor device 606 can perform an operation associated with the presentation of the media content at a display according to the first action of the first viewer.

The IPTV media system can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as a predictive operation server 630. The predictive operation server 630 can use computing and communication technology to perform function 662, which can include among other things, analyze captured video and/or audio from the viewing area 102, detect viewers, determine viewer orientation, determine viewer attentiveness, determine viewer preceding actions, determine viewer predicted actions, and/or maintain viewer profiles. The media processors 606 and wireless communication devices 616 can be provisioned with software functions 664 and 665, respectively, to utilize the services of predictive operation server 630.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
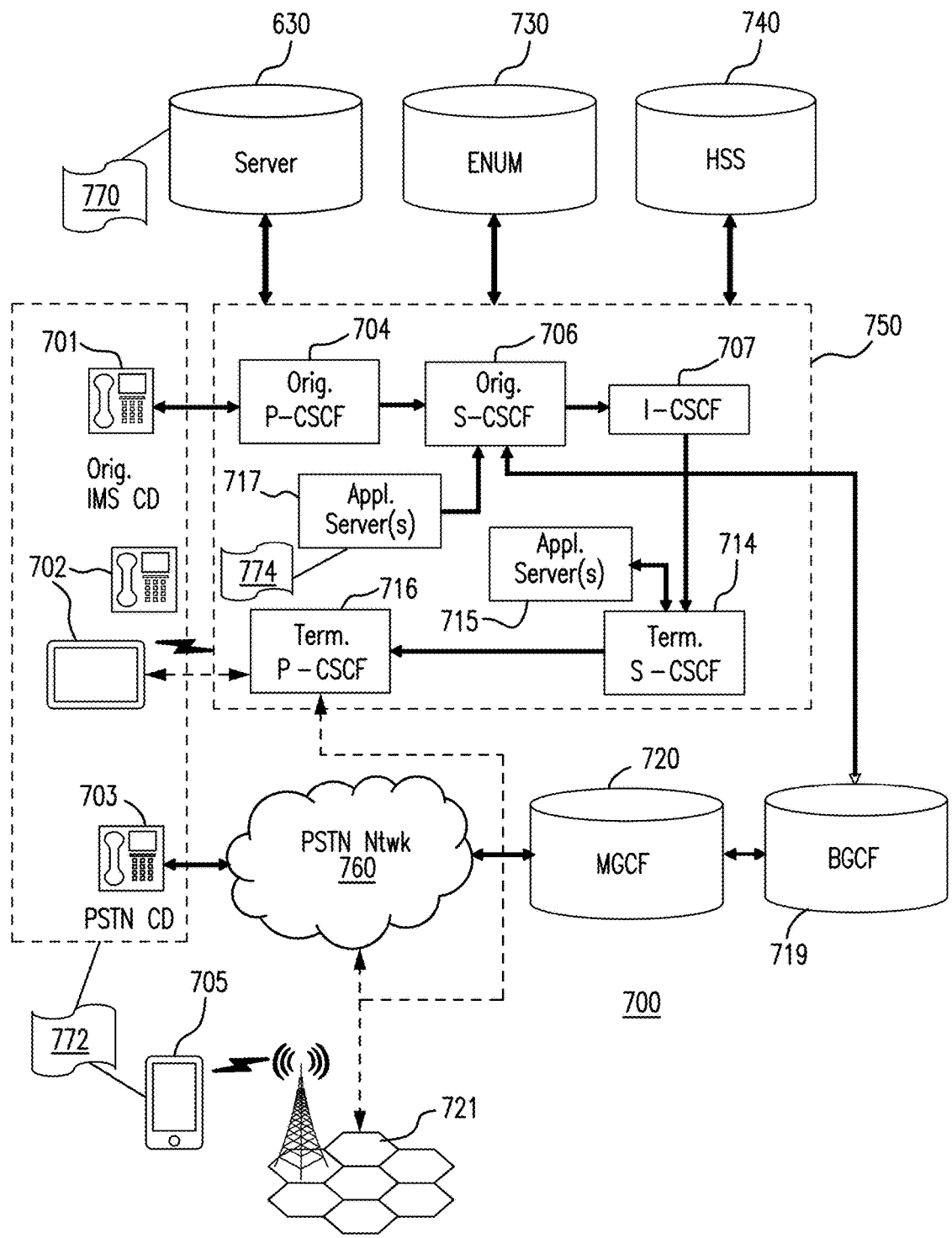

FIG. 7 depicts an illustrative embodiment of a communication system 700 employing IP Multimedia Subsystem (IMS) network architecture to facilitate the combined services of circuit-switched and packet-switched systems. Communication system 700 can be overlaid or operably coupled with communication system 600 as another representative embodiment of communication system 600. The communication system 700 can be utilized to provide media content to a media processor device 606 for presentation by a media display device 608. The system 700 can determine a viewing orientation of a first viewer in a viewing area of the media display device 608 from a plurality of images captured from the viewing area during a presentation of media content. The system 700 can further determine whether an attentiveness level of the first viewer during the presentation of the media content is below a threshold. The determination can be performed by, for example, correlating the viewing orientation with the presentation of the media content. A predicted action for the viewer can be accessed from a viewer profile associated with the viewer according to the viewing orientation and responsive to determining that the attentiveness level is below the threshold. For example, the viewer profile can correlate a plurality of prior actions with a plurality of prior viewing orientations. The media processor device 606 can perform an operation associated with the presentation of the media content at a display according to the first action of the first viewer.

Communication system 700 can comprise a Home Subscriber Server (HSS) 740, a tElephone NUmber Mapping (ENUM) server 730, and other network elements of an IMS network 750. The IMS network 750 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 750 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (ASs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 730 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication system 600 of FIG. 6.

If the terminating communication device is instead a PSTN CD such as CD 703 or CD 705 (in instances where the cellular phone only supports circuit-switched voice communications), the ENUM system 730 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 750 of FIG. 7. The cellular access base station 721 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices. In this embodiment, the cellular base station 721 may communicate directly with the IMS network 750 as shown by the arrow connecting the cellular base station 721 and the P-CSCF 716.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The predictive operation server 630 of FIG. 6 can be operably coupled to the second communication system 700 for purposes similar to those described above. Predictive operation server 630 can perform function 770 and thereby provide predictive media processor services to the CDs 701, 702, 703 and 705 of FIG. 7. CDs 701, 702, 703 and 705, which can be adapted with software 772 to perform function 774 to utilize the services of the predictive operation server 630. Predictive operation server 630 can be an integral part of the application server(s) 717 performing function 770, which can be substantially similar to function 662 and adapted to the operations of the IMS network 750.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 8:
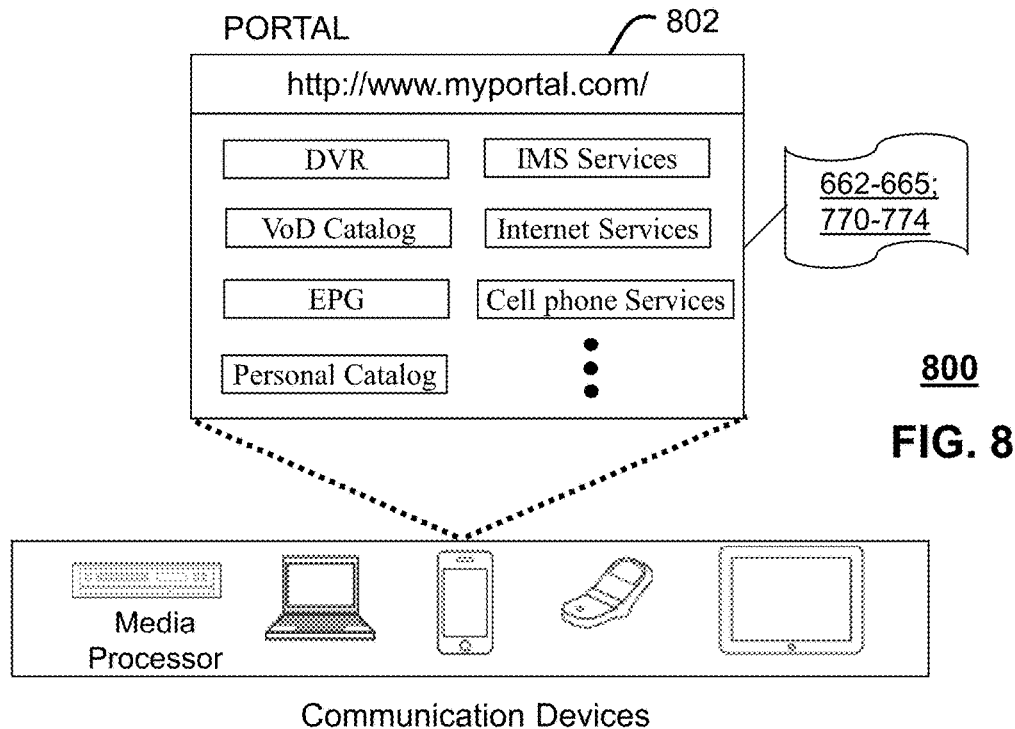
FIG. 8 depicts an illustrative embodiment of a web portal for interacting with the communication systems of FIGS. 1 and 6-7.

FIG. 8 depicts an illustrative embodiment of a web portal 802 which can be hosted by server applications operating from the computing devices 430 of the communication system 100 illustrated in FIG. 1. The communication system 700 can be utilized to provide media content to a media processor device 606 for presentation by a media display device 608. The web portal system 800 can be used to configure and maintain the viewer profile used for determining the predicted action for the viewer according to the viewing orientation and responsive to determining that the attentiveness level is below the threshold. For example, the viewer profile can correlate a plurality of prior actions with a plurality of prior viewing orientations.

The web portal 802 can be used for managing services of communication systems 600-700. A web page of the web portal 802 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 802 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 802 can also be used for provisioning IMS services described earlier, provisioning Internet services, provisioning cellular phone services, and so on.

The web portal 802 can further be utilized to manage and provision software applications 662-665, and 770-774 to adapt these applications as may be desired by subscribers and service providers of communication systems 600-700.

Figure 9:
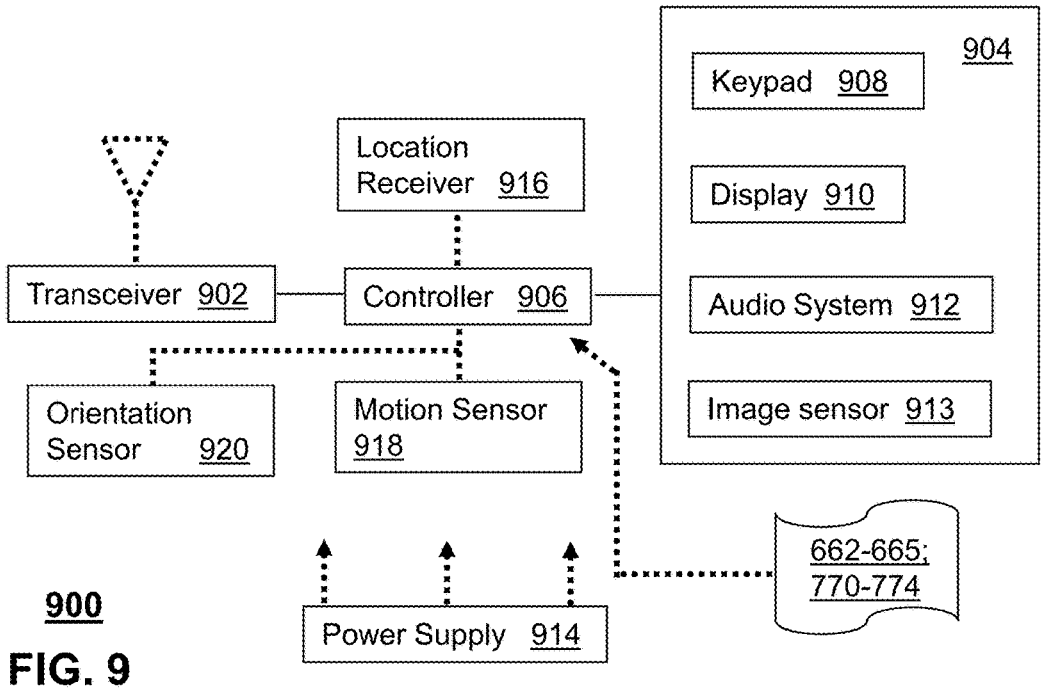
FIG. 9 depicts an illustrative embodiment of a communication device.

FIG. 9 depicts an illustrative embodiment of a communication device 900. Communication device 900 can serve in whole or in part as an illustrative embodiment of the devices depicted or otherwise described in FIGS. 1-8. The communication device 900 can be utilized to receive media content for display at a media display device 608 or can be used as the media display device 608. The communication device 900 can determine a viewing orientation of a first viewer in a viewing area from a plurality of images captured from the viewing area during a presentation of media content. The communication device 900 can further determine whether an attentiveness level of the first viewer during the presentation of the media content is below a threshold. The determination can be performed by, for example, correlating the viewing orientation with the presentation of the media content. A predicted action for the viewer can be accessed from a viewer profile associated with the viewer according to the viewing orientation and responsive to determining that the attentiveness level is below the threshold. For example, the viewer profile can correlate a plurality of prior actions with a plurality of prior viewing orientations. The communication device 900 can perform an operation associated with the presentation of the media content at a display according to the first action of the first viewer. The communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 400 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of the media processor 606, the media devices 608, or the portable communication devices 616 of FIG. 6, as well as the IMS CDs 701-702 and PSTN CDs 703-705 of FIG. 7. It will be appreciated that the communication device 900 can also represent other devices that can operate in communication systems 600-700 of FIGS. 6-7 such as a gaming console and a media player.

The communication device 900 shown in FIG. 9 or portions thereof can serve as a representation of one or more of the devices of communication systems 600-700. In addition, the controller 906 can be adapted in various embodiments to perform the functions 662-665 and 770-774, respectively.

Upon reviewing the aforementioned embodiments, it would be evident to an artisan with ordinary skill in the art that said embodiments can be modified, reduced, or enhanced without departing from the scope and spirit of the claims described below. For example, the analysis of the captured video images and/or audio from the viewing area 102 can be performed remotely from the media processor device 106. For example, a predictive operation server 170, remote from the media processor device 106, can be used to analyze capture video and audio, to determine viewer identities, location, orientations, attentiveness, and/or attentive directions. In one embodiment, the viewer profiles can be stored and/or accessed at the predictive operation server 170.

In one embodiment, the viewer profile can be configured to a default setting for all viewers. In one embodiment, the viewer profile can further include a timing factor, such as time of day, day of week, and/or date of month, that can be correlated to the predicted action. For example, the timing factor can be used to cause a determined viewer orientation to result in different predicted actions depending on the day of the week or the time of day. In one embodiment, the viewer orientation can be a gesture given by the viewer, such as a wave of a hand or a finger. In one embodiment, the media processor device 106 can further determine a comfort level of the viewer, based on the captured video images, and can determine the predicted action from the viewer profile based on the comfort level rather than, or in addition to, the attentiveness level.

In one embodiment, the media processor device 106 can use a gaze tracking function to determine where the viewer is looking. In a further embodiment, the media processor device 106 can determine the attentiveness level based, in part, on a location on the display device 108 where the viewer is found to be looking. For example, a viewer might appear to be paying no attention to the media content being presented but could desire that the media content continue as long as the viewer looks at a particular portion of the display 108 (like a scoreboard, ticker, or logo) at a sufficiently frequent rate. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
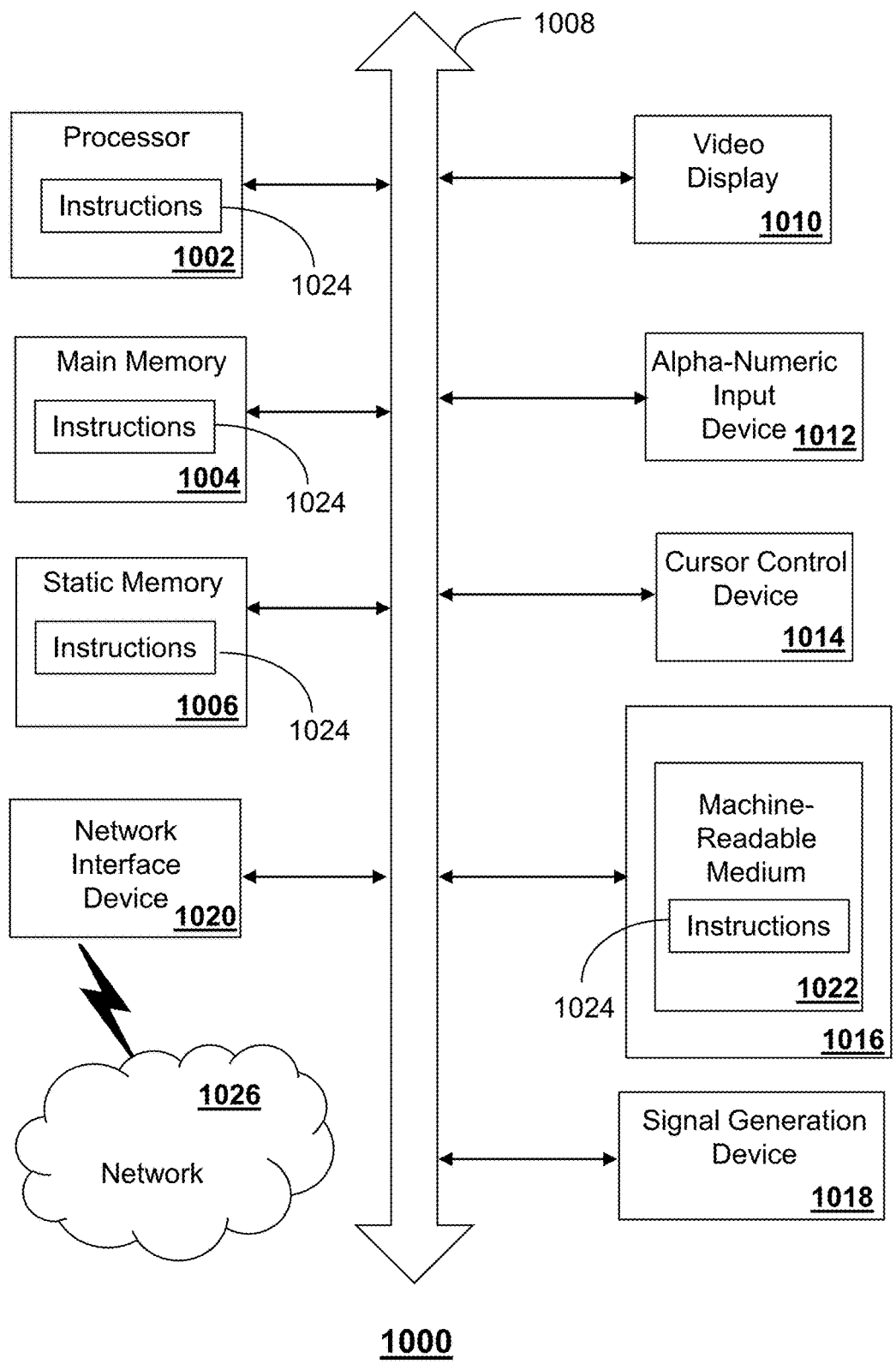
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. For example, the media processor device 106, the media server device 130, the predictive operation server 170, the media display device 108, and/or the gateway device 104 can comprise a machine in the form of a computer system 1000. In some embodiments, the machine may be connected (e.g., using a network 1026) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display. The computer system 1000 may include an input device 1012

(e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic arrays can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 1000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a processor; and a memory storing executable instructions that, when executed by the processor, perform operations, comprising:

capturing a first set of viewing orientations, viewer actions, and requested device operations associated with a first viewer;

determining a first set of correlations within the first set of viewing orientations, viewer actions, and requested device operations to generate a first viewer profile for the first viewer;

capturing a second set of viewing orientations, viewer actions, and requested device operations for a second viewer;

determining a second set of correlations within the second set of viewing orientations, viewer actions, and requested device operations to generate a second viewer profile for the second viewer;

presenting media content at a display that is visible to a viewing area;

capturing a plurality of images from the viewing area during the presenting of the media content;

identifying the first viewer in the viewing area from the plurality of images;

accessing the first viewer profile responsive to identifying the first viewer;

determining a body location of the first viewer from the plurality of images;

determining a body position of the first viewer with respect to furniture in the viewing area from the plurality of images;

determining a body posture of the first viewer from the plurality of images;

combining a first attentiveness level according to the body location, a second attentiveness level according to the body position with respect to the furniture, and a third attentiveness level according to the body posture to determine an attentiveness level for the first viewer according to the body location, the body position with respect to the furniture, and the body posture;

weighting the attentiveness level according to an attentiveness level of the first viewer with respect to an attentive direction, resulting in a weighted attentiveness level of the first viewer;

determining from the first viewer profile a first viewer action according to the weighted attentiveness level of the first viewer;

determining from the first viewer profile a first requested device operation according to the first viewer action; and performing the first requested device operation to alter the presenting of the media content at the display.

2. The device of claim 1, wherein the determining of the attentiveness level further comprises determining the first attentiveness level according to the body location, determining the second attentiveness level according to the body position with respect to the furniture, and determining the third attentiveness level according to the body posture.

3. The device of claim 1, wherein the combining of the first attentiveness level, the second attentiveness level, and the third attentiveness level to generate the attentiveness level further comprises performing a statistical analysis on the first attentiveness level, the second attentiveness level, and the third attentiveness level to generate the attentiveness level.

4. The device of claim 1, wherein the operations further comprise determining the attentive direction of the first viewer with respect to the display.

5. The device of claim 4, wherein the attentive direction is based on a head position, a facial position and an eye position of the first viewer.

6. The device of claim 1, wherein the first requested device operation to alter the presenting of the media content at the display comprises one of beginning presentation, stopping presentation, pausing presentation, restarting presentation, adjusting volume, adjusting brightness, recording the media content, selecting a different media channel, selecting different media content, turning the display ON, turning the display OFF, or any combination thereof.

7. The device of claim 1, wherein the determining of the attentiveness level for the first viewer further comprises correlating speech content with the media content, wherein the first viewer action is further associated with the speech content by the first viewer profile.

8. The device of claim 7, wherein the operations further comprise:

capturing audio from the viewing area during the presentation of the media content; and determining the speech content of the first viewer from the audio captured at the viewing area.

9. The device of claim 1, wherein the operations further comprise:

determining a second viewing orientation of the first viewer in the viewing area from the plurality of images;

determining from the first viewer profile a second viewer action that is associated with the second viewing orientation;

determining from the first viewer profile a second requested device operation that is associated with the second viewer action; and performing the second requested device operation to alter the presenting of the media content at the display.

10. The device of claim 1, wherein the operations further comprise determining a first viewing orientation for the first viewer, wherein the first viewing orientation comprises one of a gesturing, adjusting body position, rising, sitting, walking, leaving the viewing area, or any combination thereof, and wherein the determining of the first viewer action is further according to the first viewing orientation.

11. The device of claim 10, wherein the operations further comprise updating a first viewer profile with the first viewing orientation.

12. The device of claim 1, wherein operations further comprise:

determining a first gesture of the first viewer from the plurality of images;

determining from the first viewer profile a second requested device operation that is associated with the first gesture, wherein the first viewer profile further associates the first gesture with the second requested device operation; and performing the second requested device operation to alter the presenting of the media content.

13. The device of claim 1, wherein the operations further comprise:

determining another attentiveness level of the first viewer from the first viewer action; and transmitting information associated with the another attentiveness level of the first viewer to a remote device over a network.

14. The device of claim 13, wherein the operations further comprise receiving second media content from the network, wherein the second media content is selected according to the information associated with the another attentiveness level.

15. A non-transitory machine-readable storage medium comprising executable instructions that, when executed by a processor, perform operations comprising:
capturing a plurality of viewing orientations, viewer actions, and requested device operations for a plurality of viewers;
determining a first set of correlations within the plurality of viewing orientations, viewer actions, and requested device operations for a first viewer of the plurality of viewers to generate a first viewer profile for the first viewer;
determining a second set of correlations within the plurality of viewing orientations, viewer actions, and requested device operations for a second viewer of the plurality of viewers to generate a second viewer profile for the second viewer;
determining a body location of the first viewer in a viewing area from a plurality of images captured from the viewing area during a presentation of media content;
determining a body position of the first viewer with respect to furniture in the viewing area from the plurality of images;
determining a body posture of the first viewer from the plurality of images;
combining a first attentiveness level according to the body location, a second attentiveness level according to the body position with respect to the furniture, and a third attentiveness level according to the body posture to determine an attentiveness level for the first viewer according to the body location, the body position with respect to the furniture, and the body posture;
identifying from the first viewer profile a viewer action that is associated with the attentiveness level of the first viewer;
identifying from the first viewer profile a device operation that is associated with the viewer action;
updating the first viewer profile with a first viewing orientation for the first viewer; and
performing the device operation to alter the presentation of the media content at a display.

16. The non-transitory machine-readable storage medium of claim 15, wherein the determining of the attentiveness level further comprises determining the first attentiveness level according to the body location, determining the second attentiveness level according to the body position with respect to the furniture, and determining the third attentiveness level according to the body posture.

17. The non-transitory machine-readable storage medium of claim 15, wherein the device operation associated with the presentation of the media content at the display comprises one of beginning presentation, stopping presentation, pausing presentation, restarting presentation, adjusting volume, adjusting brightness, recording the media content, selecting a different media channel, selecting different media content, turning the display ON, turning the display OFF, or any combination thereof.

18. The non-transitory machine-readable storage medium of claim 15, wherein the combining of the first attentiveness level, the second attentiveness level, and the third attentiveness level to generate the attentiveness level further comprises performing a statistical analysis on the first attentiveness level, the second attentiveness level, and the third attentiveness level to generate the attentiveness level.

19. A method, comprising:
determining, by a system comprising a processor, a first set of correlations within a plurality of viewing orientations, viewer actions, and requested device operations of a plurality of viewers of the system to generate a first viewer profile for a first viewer of the plurality of viewers;
determining, by the system, a second set of correlations within the plurality of viewing orientations, viewer actions, and requested device operations of the plurality of viewers of the system to generate a second viewer profile for a second viewer of the plurality of viewers;
determining, by the system, a body location of the first viewer in a viewing area from a plurality of images captured from the viewing area during a presentation of media content;
determining, by the system, a body position of the first viewer with respect to furniture in the viewing area from the plurality of images;
determining, by the system, a body posture of the first viewer from the plurality of images;
combining, by the system, a first attentiveness level according to the body location, a second attentiveness level according to the body position with respect to the furniture, and a third attentiveness level according to the body posture to determine an attentiveness level for the first viewer according to the body location, the body position with respect to the furniture, and the body posture;
transmitting, by the system, information associated with the attentiveness level of the first viewer to a remote device of a network;
identifying, by the system, a viewer action and a device operation from the first viewer profile of the first viewer according to the attentiveness level of the first viewer; and
performing, by the system, the device operation to alter the presentation of the media content at a display.

20. The method of claim 19, wherein the determining of the attentiveness level further comprises determining the first attentiveness level according to the body location, determining the second attentiveness level according to the body position with respect to the furniture, and determining the third attentiveness level according to the body posture.

* * * * *